(12) United States Patent
Lee et al.

(10) Patent No.: US 6,941,241 B2
(45) Date of Patent: *Sep. 6, 2005

(54) METHOD FOR MEASURING THE ABSOLUTE STEERING ANGLE OF STEERING SHAFT FOR VEHICLE

(75) Inventors: Jong-Hwa Lee, Seoul (KR); Wan-Sub Kim, Kyunggi-do (KR); Chang-Won Kang, Seoul (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/748,151

(22) Filed: Dec. 31, 2003

(65) Prior Publication Data

US 2005/0114075 A1  May 26, 2005

(30) Foreign Application Priority Data

Nov. 11, 2003  (KR) ...................... 10-2003-0079321

(51) Int. Cl.$^7$ ............................................. G06F 15/00
(52) U.S. Cl. ................................................... 702/151
(58) Field of Search .................... 702/94, 95, 150–154; 33/1 PT, 1 N, 534; 701/41

(56) References Cited

U.S. PATENT DOCUMENTS 5,930,905 A      8/1999   Zabler et al. ............... 33/1 PT
6,466,889 B1    10/2002  Schodlbauer ............... 702/150
6,848,187 B2 *   2/2005   Ito et al. ...................... 33/1 PT
6,862,551 B1 *   3/2005   Kang et al. .................. 702/151
2004/0078166 A1 * 4/2004 Shin ........................... 702/145

OTHER PUBLICATIONS

U.S. Appl. No. 10/748,152, filed Dec. 31, 2003, Lee et al., "Method for Measuring the Absolute Steering Angle of Steering Shaft for Vehicle".*

* cited by examiner

*Primary Examiner*—Michael Nghiem
(74) *Attorney, Agent, or Firm*—Greenblum & Bernstein, P.L.C.

(57) ABSTRACT

A method is provided for measuring an absolute steering angle $\Phi$ of a steering shaft for a vehicle, using a first rotatable body that rotates together with the steering shaft of the vehicle at a predetermined rotation ratio. The method includes obtaining a $\Psi_M'$ value by measuring a relative rotational angle $\Psi'$ of the first rotatable body using an angle sensor having a measurement range of $\Omega$. The method also includes obtaining a present value for a frequency i-value of the first rotatable body by comparing the present $\Psi_M'$ value to a previous $\Psi_M'$ value. The method also includes obtaining a present value for a absolute steering angle $\Phi 1$ of the steering shaft from a present value for an absolute rotational angle $\Psi$ of the first rotatable body by using the $\Psi_M'$ value and the present i-value.

2 Claims, 3 Drawing Sheets

[FIG. 1]
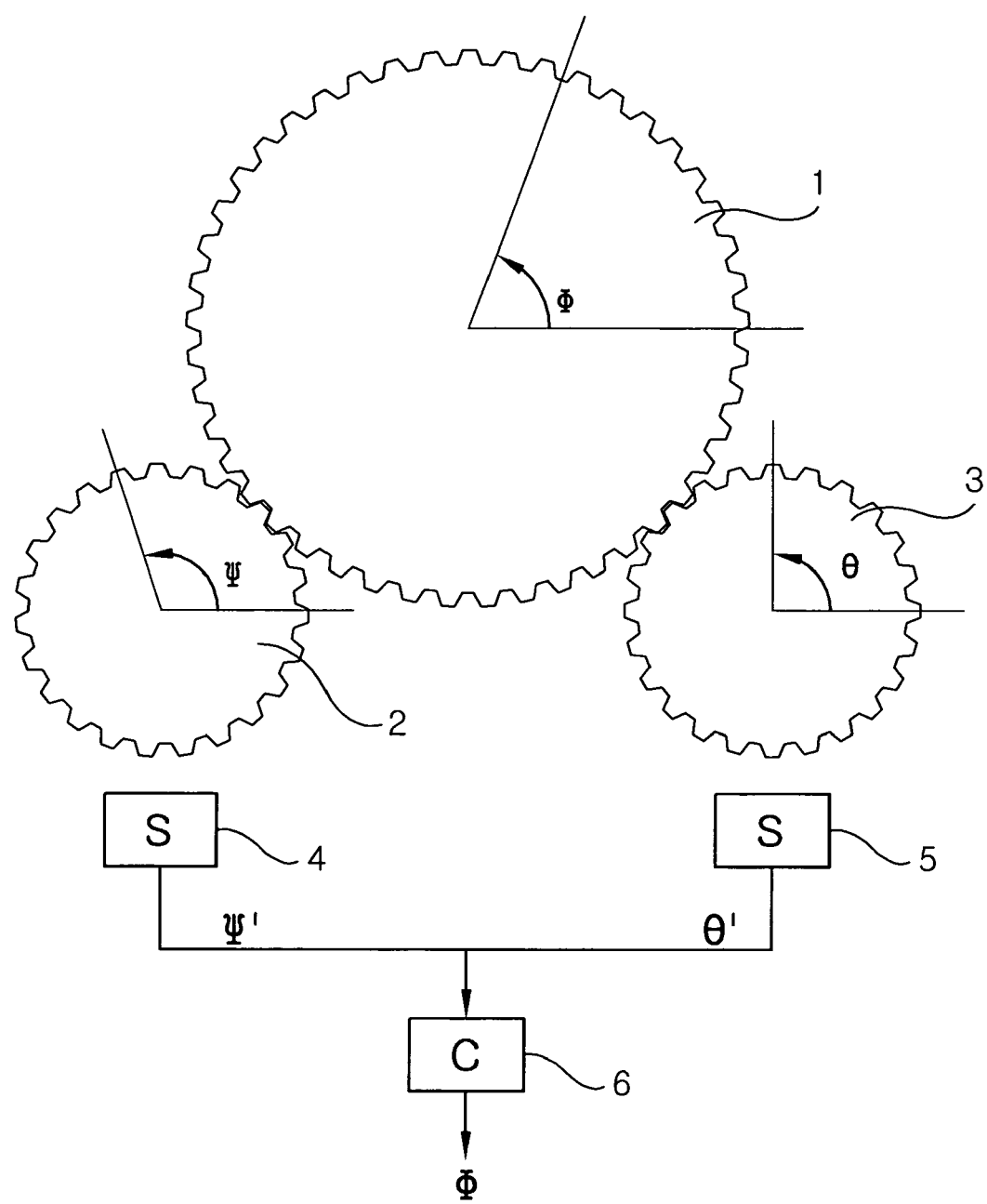

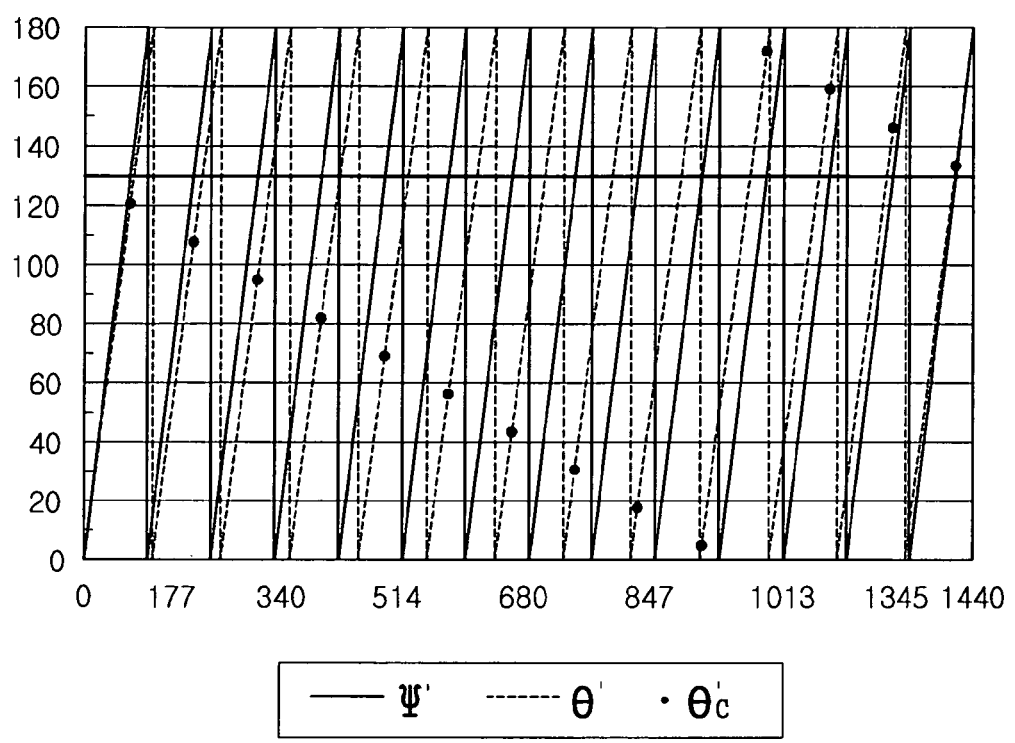

[FIG. 3]
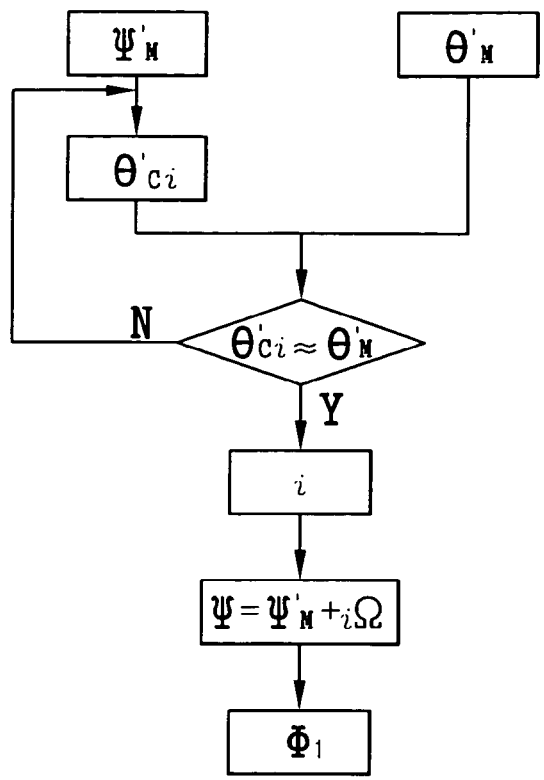
[FIG. 4]
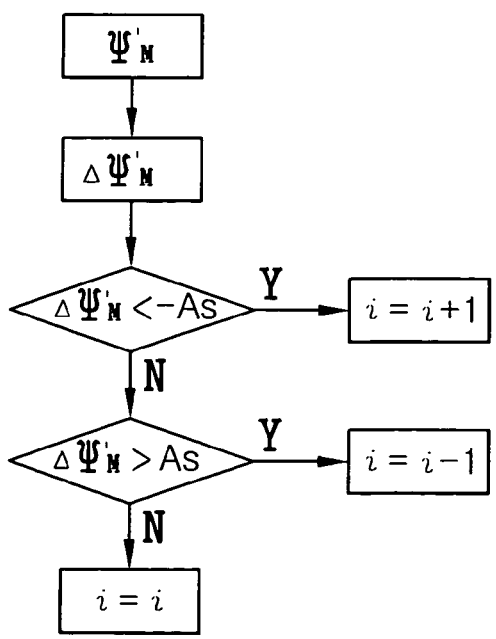

METHOD FOR MEASURING THE ABSOLUTE STEERING ANGLE OF STEERING SHAFT FOR VEHICLE

RELATED APPLICATIONS

The present disclosure relates to subject matter contained in priority Korean Application No. 10-2003-0079321, filed on Nov. 11, 2003, which is herein expressly incorporated by reference in its entirety.

BACKGROUND OF THE INVENTION

1. Field of the Invention

The present invention relates to a method for measuring an absolute steering angle of a steering shaft for a vehicle, and, more specifically, to a method for measuring an absolute steering angle of a steering shaft by using two rotatable bodies that rotate together with the steering shaft at a predetermined rotation ratio.

2. Description of the Related Art

In general, measurement of an absolute steering angle of a steering shaft using an angle sensor only is known to be difficult because the measurement range is greater than 360°.

Also the steering angle of the steering shaft should be immediately measured following start-up of a vehicle, regardless of an initial angular position. However, a prior steering angle would not be used to measure a relative change at present stage.

U.S. Pat. Nos. 5,930,905 and 6,466,889B1 disclose a method for measuring an absolute steering angle of a steering shaft based on rotational angular measurements of a first rotatable body and a second rotatable body that rotate together with a steering shaft at a predetermined rotation ratio.

In the disclosures, the absolute rotation angle of the first rotatable body and of the second rotatable body are expressed by $\Psi=\Psi'+i\Omega$ and $\theta=\theta'+j\Omega$, respectively (wherein, $\Omega$ indicates a measurement range of an angle sensor measuring the $\Psi'$ and the $\theta'$; i is a whole number representing the number of times when the first rotatable body's absolute rotation angle $\Psi$ is greater than the $\Omega$, i.e. a frequency of the first rotatable body; and j is a frequency of the second rotatable body), and the absolute steering angle, $\Phi$, can be obtained through a specific calculation procedure using measurements of $\Psi'$ and $\theta'$.

According to the U.S. Pat. No. 5,930,905, the measurements of $\Psi$ and $\theta'$ are substituted to the following equation (1), which is derived from a geometrical relation among $\Psi$, $\theta$, and $\Phi$ to get k, and by rounding off k, a whole number k is obtained. Then the k, $\Psi'$ and $\theta'$ are substituted to the following equation (2) to obtain $\Phi$.

$$k=\{(m+1)\Theta'-m\Psi'\}/\Omega \quad \text{<Equation 1>}$$

$$\Phi=\{m\Psi'+(m+1)\Theta'-(2m+1)k\Omega\}/2n \quad \text{<Equation 2>}$$

(Here, m indicates the number of gear teeth of the first rotatable body; m+1 indicates the number of gear teeth of the second rotatable body; and n indicates the number of gear teeth formed on the steering shaft engaged with the first and second rotatable bodies.)

On the other hand, according to the U.S. Pat. No. 6,466,889B1, the steering angle, $\Phi$, can be obtained directly from a relation between the difference of absolute rotation angles of two rotatable bodies, $\Psi-\theta$, and 'i' of the first rotatable body (or 'j' of the second rotatable body). Here, $\Psi-\theta$ is obtained by adding $\Omega$ to a measurement of $\Psi'-\theta'$ if the measurement is a negative value, or by applying a measurement of $\Psi'-\theta'$ if the measurement is not a negative value. The 'i' is calculated from the relation between $\Psi-\theta$, and i, $\Psi$ is calculated from the known values of $\Psi'$ and i. Based on these values, the absolute steering angle of a steering shaft, $\Phi$, is obtained.

When 'i' becomes k1 as the steering shaft is fully rotated, the rotation angle difference $\Psi-\theta$ should be equal or less than the measurement range of the angle sensor, namely $\Omega$ (cf. in the U.S. Pat. No. 6,466,889B1, $\Psi-\theta$ is set to be equal to $\Omega$). In other words, the rotation angle difference $\Psi-\theta$ successively varies from 0° to $\Omega$ until the steering shaft is fully rotated, and i-value varies step by step from 0 to k1.

In particular, the U.S. Pat. No. 6,466,889B1 made an assumption that $\Omega\theta\theta$ and i-value are in a linearly proportional relation with each other, meaning that the value for successively varies from 0 to k1 as the rotation angle difference $\Psi-\theta$ successively varies from 0° to $\Omega$. Also, the value of 'i' is obtained by taking a maximum whole number that is smaller than a value obtained from the multiplication of $\Psi-\theta$ measured value and $k1/\Omega$. For example, if $\psi-\theta$ times $k1/\Omega$ is 5.9, i is 5.

However, the above method poses a problem that 'i-j' has to be either 0 or 1 and should not be greater than 2 because a maximum value of $\Psi-\theta$ cannot be greater than $\Omega$.

SUMMARY OF THE INVENTION

It is, therefore, an object of the present invention to provide a method for measuring an absolute steering angle of a steering shaft rotating by more than 360 degrees, to reduce measurement errors and to simplify a calculation procedure.

Another object of the present invention is to provide a method for measuring an absolute steering angle using one single rotatable body, in which the rotatable body includes a memory means for storing an i-value.

Still another object of the present invention is to provide a method for measuring an absolute steering angle of a steering shaft to obtain a frequency of a first rotatable body, i, or a frequency of a second rotatable body, j, without using $\Psi-\theta$, and obtain the absolute steering angle with simplified calculation, as once the i-value or the j-value is obtained.

As for the method for measuring the steering angle of the steering shaft for a vehicle, a first rotatable body that rotates together with the steering shaft at a predetermined ratio is used. When needed, a second rotatable body that rotates together with the steering shaft at a predetermined ratio can also be used.

An absolute rotational angle of the first rotatable body, $\Psi$, can be expressed as $\Psi'+i\Omega$, and an absolute rotational angle of the second rotatable body, $\theta$, can be expressed as $\theta'+j\Omega$. $\Psi'$ and $\theta'$ are measured by means of an angle sensor. Here, $\Omega$ represents the measurement ranges of the angle sensors for measuring $\Psi'$ and $\theta'$, i is a whole number that represents a frequency of the first rotatable body indicating the number of times the first rotatable body ratates over $\Omega$ (for example, if $\Psi$ is 380° in the case that $\Omega$ is 180°, then i is 2), and j is a frequency of the second rotatably body. In other words, the absolute rotational angle of the first rotatable body, $\Psi$, can be expressed by $\Psi'+i\Omega$, wherein $\Psi'$ is a relative rotational angle measured by the angle sensor whose measurement range is $\Omega$. The absolute rotational angle of the second rotatable body, $\theta$, can be expressed in the same manner.

The measurement range of the angle sensor, $\Omega$, can be 180° or 360° or a different degree. Either contact angle sensors or non-contact angle sensors can be utilized as long as the angle sensors ard suitable for the measurement of Ψ' and θ'.

In the present invention, the absolute steering angle Φ of the steering shaft is measure by using the first rotatable body. In order to measure a successive present Φ value after measuring a previous Φ value of the steering shaft, an angle sensor whose measurement range is Ω is used to measure a relative rotational angle Ψ' of the first rotatable body to obtain its measurement value $\Psi_M'$. By comparing a present $\Psi_M'$ value to a previous $\Psi_M'$ value, a present i-value, which is a frequency of the first rotatable body, is determined from a previous i-value. Then the present $\Psi_M'$ value and the present i-value are used to obtain an absolute rotational angle of the first rotatable body, i.e. a present Ψ value, and from this present value for the absolute rotational angle, a present value of the absolute steering angle Φ of the steering shaft is obtained (hereinafter, the resulting Φ is called Φ1).

To measure the present value of the absolute steering angle Φ, a previous value for the frequency i of the first rotatable body should be determined first. That is, to obtain the absolute steering angle Φ from the present i-value for the first rotatable body as suggested by the present invention, it would be necessary to prepare a method for obtaining or defining the previous i-value first.

There could be diverse methods for determining the i-value. As an example, the i-value could be stored in a memory and read out later. When the memory is used, it is possible to measure the absolute steering angle using only one rotatably body like the first rotatable body.

Meanwhile, without using the memory means, an i-value can also be determined by utilizing a second rotatable body that rotates together with the steering shaft at a predetermined rotation ratio. In other words, the angle sensors, whose measurement ranges ard Ωs, are used to get Ψ' and θ' measurements, i.e. $\Psi_M'$ and $\theta_M'$. Then, based on a relation between Ψ' and θ', a plurality of θ''s corresponding to the $\Psi_M'$ is calculated to obtain their calculation values $\theta_C'$. By comparing the plurality of $\theta_C'$ to the $\theta_M'$, a frequency of the first rotatable body, i, is obtained. Further details on this method will be provided later.

When the previous i-value is determined through the above procedure, the relative rotational angle Ψ' of the first rotatable body is measured by using the angle sensor whose measurement range is Ω. To obtain a present i-value, 1 is added/subtracted to/from the previous i-value, based on a comparison result of a previous $\Psi_M'$ value to a present $\Psi_M'$ value. The reason for that is when the i-value is increased by as much as 1, the value of $\Psi_M'$ varies from Ω to 0, and when the i-value is decreased by as much as 1, the value of $\Psi_M'$ varies from 0 to Ω. That is to say, $\Psi_M'$ varies a lot before and after a variation of the i-value. The above procedure is useful not only for simplifying the calculation procedure, but also for freeing the influence of a measurement error included in $\theta_M'$ upon the i-value.

When a secondary rotatable body is additionally used, the frequency j of the second rotatable body is determined using the same method described above. Afterwards, by comparing a present $\theta_M'$ value to a previous $\theta_M'$ value, 1 is added/subtracted to/from the previous j-value, resulting in a present j-value. From the present j-value, the present value for the absolute steering angle Φ is obtained (hereinafter, the resulting Φ is called Φ2). Finally, the mean value of the Φ1 and the Φ2 is taken for the absolute steering angle, Φ, of the steering shaft. By taking the mean value, the measurement errors included in $\Psi_M'$ and $\theta_M'$ can be cancelled out.

BRIEF DESCRIPTION OF THE DRAWINGS

The above objects, features and advantages of the present invention will become more apparent from the following detailed description when taken in conjunction with the accompanying drawings, in which:

FIG. 1 illustrates a preferred embodiment of the present invention;

FIG. 2 graphically illustrates a relation between Ψ' and θ' in accordance with a steering angle of a steering shaft;

FIG. 3 illustrates a calculation procedure to obtain φ1 according to the present invention; and FIG. 4 illustrates a simplified calculation procedure for obtaining 'i' according to the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 shows a first rotatable body 2 and a second rotatable body 3 being engaged with a steering shaft 1, angle sensors 4 and 5 for measuring relative rotation angles Ψ' and θ' of the first and second rotatable bodies, and an operational circuit 6 for conducting a designated operation using $\Psi_M'$ and $\theta_M'$ measurements provided by the sensors 4 and 5 and for outputting a resulting Φ. Here, a rotation ratio (r1) of the steering shaft to the first rotatable body is 7/4, and a rotation ratio (r2) of the steering shaft to the second rotatable body is 6.5/4 (the numbers of the teeth of the gears represented in FIG. 1 may not be correct). FIG. 2 graphically shows the relation between the relative rotation angle (Ψ') of the first rotatable body and a relative rotation angle (θ') of the second rotatable body during 4 rotations of the steering shaft. In FIG. 2, x-axis denotes the steering angle Φ, and Ω is 180°. FIG. 3 illustrates the procedure for obtaining the absolute steering angle, Φ, of the steering shaft, based on measurements of the Ψ' and the θ'.

Preferably, the relation between the relative rotation angles of the first and second rotatable bodies as shown FIG. 2 is obtained experimentally by measuring the relative rotation angle (ψ') of the first rotatable body and the relative rotation angle (θ') of the second rotatable body, as varing the steering angle of the steering shaft.

As shown in FIG. 3, $\psi_M'$ and $\theta_M'$ are measured by employing angle sensors. Then by taking advantage of the relation shown FIG. 2, a plurality of $\theta_C'$s corresponding the $\psi_M'$ are calculated ($\theta_{Ci}'$ in FIG. 3 indicates $\theta_C'$ corresponding to 'i'). Then the closest value among the $\theta_C'$s to $\theta_M'$ is found to get i. For instance, suppose that $\Psi_M'= 130°$, and $\theta_M'=105°$. As shown on the graph of FIG. 2, when Ψ'=130°, its corresponding $\theta_C'$s, given that i ranges from 0 to 13, are 120.7°, 107.9°, 95°, 82.1°, 69.3°, 56.4°, 43.6°, 30.7°, 17.9°, 5°, 172.1°, 159.3°, 146.4°, and 133.6°, successively. Among these values for $\theta_C'$s, 107.9° is the closest value to the $\theta_M'$s, which is 105°, so the corresponding i becomes 1.

Using the known i-value and $\Psi_M'$ values, the steering angle, Φ1, of the steering shaft can be calculated applying the following equation 5.

$$\Phi1=1/r1(\Psi_M'+i\Omega)=4/7(130°+180°)=177° \qquad \text{<Equation 5>}$$

Once the i-value is determined, a present $\Psi_M'$ value is compared to a previous $\Psi_M'$ value, and based on the comparison result, 1 is added/subtracted to/from a previous i-value. For example, if $\Delta\Psi_M'$ (i.e. the present $\Psi_M'$ value—the previous $\Psi_M'$ value) is smaller than a specific negative value, add 1 to the previous i-value, and if $\Delta\Psi_M'$ is larger than the specific positive value, subtract 1 from the previous i-value, if $\Delta\Psi_M'$ belongs to neither case, the previous i-value is maintained as the present i-value.

The above procedure is well illustrated in FIG. 4. As shown in FIG. 4, if $\Delta\Psi_M'$ is smaller than a specific value, say, -As, 1 is added to the previous i-value, and if $\Delta\Psi_M'$ is larger than As, 1 is subtracted from the previous i-value, and in neither case, the present i-value maintains the present i-value. For instance, suppose that the previous i-value is 3, the specific value As is 170°, the previous $\Psi_M'$ value is 179°, and the present $\Psi_M'$ value is 1°. Then the $\Delta\Psi_M'$ equals to −178°, which is smaller than −170°, so the present i-value becomes 4. On the other hand, if the previous $\Psi_M'$ value is 1° and the present $\Psi_M'$ value is 179°, the $\Delta\Psi_M'$ equals to 178°, which is larger than 170°, so the present i-value becomes 2.

Once the present i-value is obtained, the resulting i-value and the present $\Psi_M'$ value are substituted to the equation 5 to obtain the present $\Phi1$.

Similar to the method for obtaining the i-value by calculating the plurality of $\theta_C$'s from the $\Psi_M'$ value, a j-value also can be obtained by calculating a plurality of $\Psi_C$'s from the $\theta_M'$. Then a successive present j-value can be obtained by comparing a present $\theta_M'$ value to a previous $\theta_M'$ value. Using these known values, the steering angle, $\Phi2$, of the steering shaft can be obtained applying the following equation 6.

$$\Phi2 = 1/r2\ (\Theta_M' + j\Omega) \qquad \text{<Equation 6>}$$

Preferably, the mean value of the $\Phi1$ and $\Phi2$ is used to define the steering angle of the steering shaft. By taking the mean value, it is possible to minimize measurement errors in $\Psi_M'$ and $\theta_M'$ values.

In conclusion, according to the present invention, the steering angle can be obtained directly from the i-value and the j-value, without using $\Psi-\theta$. Once the i-value and the j-value are obtained, the following calculation procedure is much simplified.

In other words, once the i-value is obtained, a successive i-value can be obtained simply by comparing the present $\Psi_M'$ value to the previous $\Psi_M'$ value. More importantly, when the second rotatable body is additionally used, the i-value is no longer under the influence of measurement error included in the $\theta_M'$ value. Moreover, although the $\theta_M'$ value may not be measured because of a mechanical trouble in the angle sensor, the steering angle for the steering shaft can still be measured.

In addition, the present invention can reduce calculation errors found in rounding off steps to define the absolute steering angle (e.g., rounding off 'k'-value in U.S. Pat. No. 5,930,905 or rounding off 'i'-value in U.S. Pat. No. 6,466, 889B1). That is, the present invention can resolve a serious error (±1) in the rounding off of the absolute steering angle.

Further, the memory means for storing an i-value makes it possible to measure the absolute steering angle using one single rotatable body.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for measuring an absolute steering angle $\Phi$ of a steering shaft for a vehicle using a first rotatable body that rotates together with the steering shaft of the vehicle at a predetermined rotation ratio, the method comprising:

obtaining a measurement value $\Psi_M'$ of a relative rotational angle $\Psi'$ of the first rotatable body using a first angle sensor having a measurement range of $\Omega$;

obtaining a present value for a frequency i-value of the first rotatable body by comparing the present $\Psi_M'$ value to a previous $\Psi_M'$ value; and obtaining a present value for an absolute steering angle $\Phi1$ of the steering shaft from a present value for an absolute rotational angle $\Psi$ of the first rotatable body, using the $\Psi_M'$ value and the present i-value.

2. The method according to claim 1, comprising:

obtaining a measurement value $\theta_M'$ of a relative rotational angle $\theta'$ of a second rotatable body, which is rotating together with the steering shaft at a predetermined rotation ratio, using a second angle sensor having a measurement range of $\Omega$;

obtaining a present value for a frequency j-value of the second rotatable body by comparing a present $\theta_M'$ value to a previous $\theta_M'$ value; and obtaining a present value for the absolute steering angle $\Phi2$ of the steering shaft from a present value for an absolute rotational angle $\theta$ of the second rotatable body, using the $\theta_M'$ value and the present j-value; and taking a mean value of the $\Phi1$ and the $\Phi2$.

* * * * *